United States Patent
Vine et al.

[15] 3,635,682
[45] Jan. 18, 1972

[54] FUEL CELL REACTOR-BURNER ASSEMBLY

[72] Inventors: Raymond W. Vine, Bolton; Paul R. Watson, Marlborough; Warren L. Luoma, East Hartford, all of Conn.

[73] Assignee: United Aircraft Corporation, East Hartford, Conn.

[22] Filed: June 13, 1969

[21] Appl. No.: 833,109

[52] U.S. Cl. .......................23/288 R, 23/210, 23/212 R, 23/212 B, 23/277 R, 23/281, 23/288 H, 23/288 K, 48/94, 48/196 R, 48/214
[51] Int. Cl. ..........................................B01j 9/04, B01j 7/00
[58] Field of Search........23/288 R, 288.4, 288.9 H, 288.9 K, 23/277 R, 281, 210, 212 R; 48/94, 196 R, 214

[56] References Cited

UNITED STATES PATENTS

| | | | |
|---|---|---|---|
| 1,738,620 | 12/1929 | Umpleby | 23/212 UX |
| 1,936,118 | 11/1933 | Roka | 23/288 |
| 2,079,017 | 5/1937 | Iddings et al. | 23/277 |
| 2,173,844 | 9/1939 | Houdry | 23/288 UX |
| 2,778,610 | 1/1957 | Bruegger | 23/288 X |
| 3,522,019 | 7/1970 | Buswell et al. | 23/288 |

FOREIGN PATENTS OR APPLICATIONS

| | | | |
|---|---|---|---|
| 1,151,267 | 5/1969 | Great Britain | 23/212 |

*Primary Examiner*—Morris O. Wolk
*Assistant Examiner*—Barry S. Richman
*Attorney*—Edmund C. Meisinger

[57] ABSTRACT

An improved temperature distribution reactor-burner assembly, consisting essentially of a burner insert having a straight section and an inwardly tapering section serving to choke the flow of hot combustion gases in the vortex burner at the location where increased heat transfer to the reactor can be desired. Heat-transfer fins are disposed on the external wall of the reactor can to increase the area exposed to the swirling exhaust gases. The fins function to absorb and block radiation from the swirling combustion flames and the hot burner walls.

6 Claims, 2 Drawing Figures

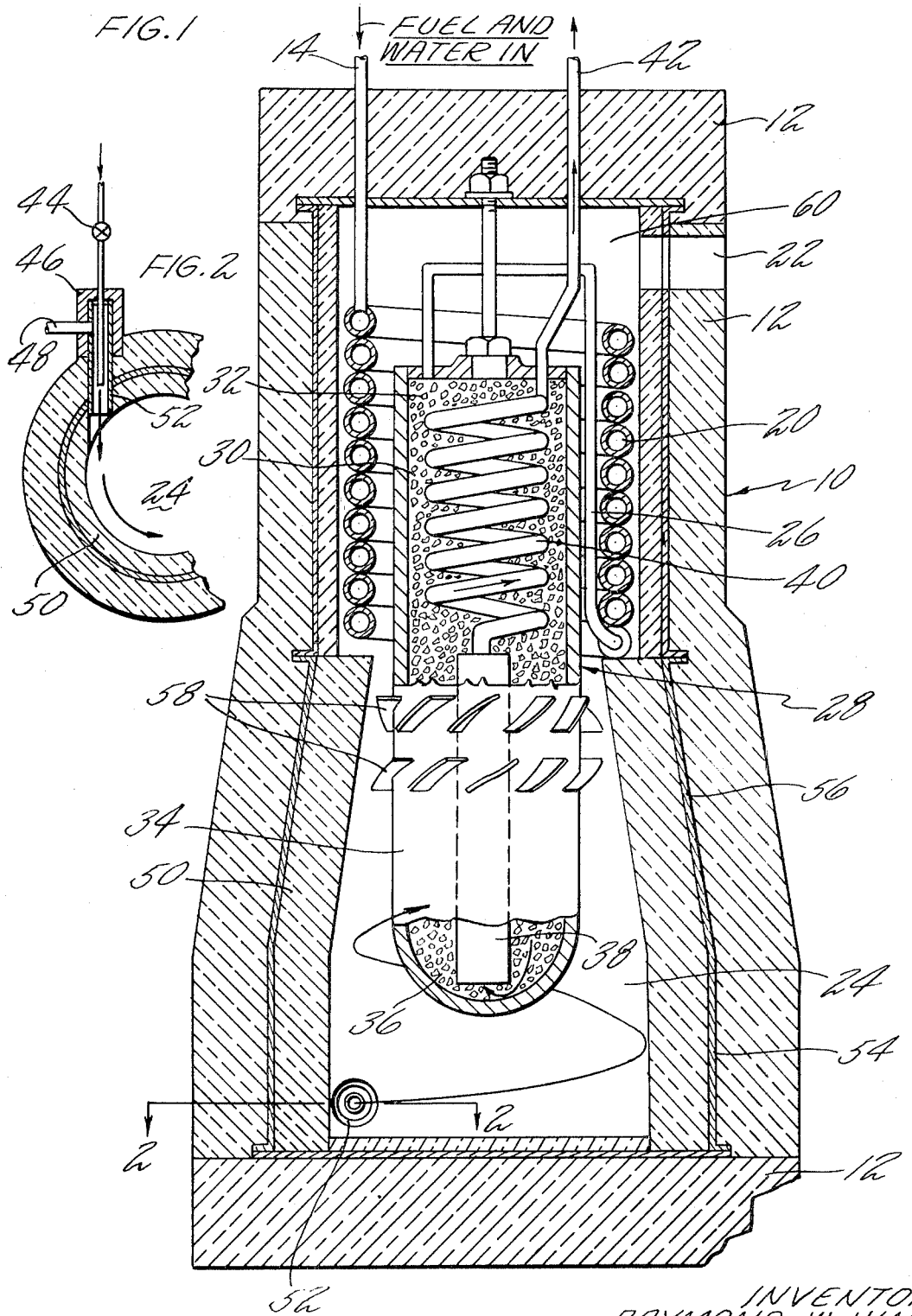

FUEL CELL REACTOR-BURNER ASSEMBLY

BACKGROUND OF THE INVENTION

This invention relates to fuel cell reformers and more specifically concerns a reactor-burner assembly capable of providing an improved temperature distribution along the axis of the reactor canister.

Reactants for early fuel cells were pure hydrogen and pure oxygen directed to the fuel cells from storage tanks. There has been considerably effort expended to develop reformers wherein an inexpensive hydrocarbon fuel is converted to hydrogen and carbon oxide products for direct use in the fuel cell. Although various techniques have been proposed for converting hydrocarbons, primary emphasis has been placed upon the catalytic conversion of hydrocarbon fuels at relatively high temperatures. Although some fuel cells have been produced which utilize relatively impure hydrogen, generally pure hydrogen has been recognized as the preferred fuel. A reformer system for converting hydrocarbon fuels is disclosed in an application by Buswell et. al. having a U.S. Ser. No 476,906 and now U.S. Pat. No. 3,446,594 and having the same assignee as this application.

The prior art burner-reactor assembly is basically a thermal insulating cylindrical burner surrounding the reactor canister. Combustion takes place in the cavity between the burner wall and the reactor, and combustion should produce an essentially uniform temperature field over the bottom half of the reactor canister. Initial development was concentrated on porous insert structures wherein fuel passed through the burner walls which acted as flame holders for the combustion gases. Combustion occurred over the entire inside wall of these cylindrical units and a very uniform temperature field was produced. However, with low heating levels, the gas flow rate through the porous inserts was not sufficient to maintain the insert temperature below the flash point of the combustion gases. As a result, preignition occurred with burning occurring outside the insert. In addition to the preignition problem, the porous insert design was not readily adaptable to automatic ignition systems.

In view of these difficulties, a vortex-type burner reduction developed. In the vortex burner, the combustion gases enter through a nozzle near the bottom of the combustion chamber. The nozzle is set at an angle to the chamber walls to impart a swirling flow pattern to the gases. It is desirable to have a uniform temperature distribution in the primary reactor chamber which is several hundred degrees above the temperature in the prereactor chamber. The temperature patterns produced to date have not been as uniform as those produced by the porous structures, but the vortex design eliminated the preignition problems and also resulted in substantial reduction in the cost of materials.

SUMMARY OF THE INVENTION

It is an object of this invention to provide an improved vortex burner-reactor arrangement resulting in an improved temperature distribution along the catalytic reactor.

Another object of this invention is the provision of an improved burner arrangement consisting of a cylindrical section and a truncated cone section in combination with heat-transfer fins mounted on the reactor canister. An important aspect of this combination lies in an improved reactor canister temperature distribution as well as improved thermal efficiency.

In accordance with this invention, a burner liner consisting of a cylindrical section and a tapered section is provided in combination with external heat-transfer fins on the reactor to improve the temperature profile along the reactor canister. The object of using the truncated cone shape in a predetermined location is to choke the flow in a particular area thereby increasing the Reynold's number resulting in an increased convection heat-transfer coefficient in this region. Heat-transfer fins located about the midsection of the reactor canister have a twofold purpose, namely, to increase the amount of heat transferred from the combustion gases and to absorb and block radiation from the vortex flames in the burner and from the hot burner walls. The fins are strategically positioned tangent to helices in order to efficiently remove heat from the swirling hot gases and to cooperate with and direct the hot gases and to eliminate any lines of sight for radiation from the combustion chamber to the top part of the reactor canister.

BRIEF DESCRIPTION OF THE DRAWINGS

FIG. 1 is a sectional view of the improved reactor-burner assembly.

FIG. 2 is a reduced fragmentary sectional view thereof taken along the line 2—2 of FIG. 1.

DESCRIPTION OF THE PREFERRED EMBODIMENT

Referring to the attached drawings, FIG. 1 is a cross section of an apparatus embodying the present invention and having an outer casing 10 with an inner layer of insulation 12. Hydrocarbon fuel and water in a predetermined ratio is supplied through conduit 14 to a preheater shown as coiled tubing 20. Hot combustion gases swirling upward past the tubing 20 from combustion chamber 24 provide heat necessary to raise the temperature of the feed to about 200° to 500° C. and exit through exhaust 22. The feedstream is then passed through conduit 26 to the reactor canister shown generally as 28. The upper portion of the reactor canister 28 is the prereactor chamber 30 containing dehydrogenation catalyst particles 32. The lower portion of the reactor canister 28 is the primary reactor chamber 34 which also contains dehydrogenation catalyst particles 36. The feedstream passing through the prereactor chamber 30 is heated partly by the passage of hot combustion gases external of the prereactor and partly by the reformed gases exiting through heat-exchanger coil 40. The feedstream temperature increases to about 350° to 650° C. wherein initial conversion of the hydrocarbon feed occurs. The stream thereafter passes into the primary reactor chamber 34 and the feed is further decomposed in the presence of the dehydrogenation catalyst 36, to form additional hydrogen, carbon oxide products and certain residual gases. The catalyst temperature in the primary reactor chamber is preferably maintained constant in the range of about 700° to 1000° C. by the combustion process occurring in the burner cavity 24.

The hydrogen rich reformed fuel is collected at the bottom of pipe 38 and directed to the heat-exchanger coil 40 in the prereactor chamber where, as previously stated, heat is given off to maintain the temperature of the prereactor bed. After the reformed feedstream has passed through the heat exchanger in the prereactor, its temperature has been reduced and it may then be passed out through conduit 42 to a shift converter or to a purifier where hydrogen may be separated in well-known fashion or used directly in a fuel cell.

Referring to FIG. 2, the residual gases from the purifier or the anode effluent is commonly directed past a pressure-regulating valve 44 to an ejector 46 where the fuel gases are the primary stream in the ejector and air is aspirated thereinto through conduit 48. Vortex burning is accomplished through the direction of the ejector 46 at an angle to the walls 50 of the burner cavity 24 thereby imparting a swirling motion to the combustion gases. Ignition and startup of combustion in the burner cavity form no part of the present invention and will not be described herein. The ejector 46 may extend partially into the combustion chamber. The length of the ejector body 52 is relatively short so that only partial premixing of the fuel and air occurs in the ejector and flashback is substantially avoided.

It will be appreciated that the temperature of the dehydrogenation catalyst in the primary reactor chamber should be essentially uniform to provide optimum performance and that the temperature in the prereactor chamber 28 should be several hundred degrees lower than the temperature in the primary reactor. It has been found that enlarging the burner casing in the bottom portion 54 to provide an essentially cylindrical inner wall combined with an inwardly and upwardly tapering truncated conical section 56 results in a more uniform temperature distribution within the primary reactor chamber 34 of the reactor canister 28. A burner insert 50 conforming to the burner outer walls 54 and 56 is incorporated to assist the burner casing to withstand the burner temperatures experienced and to withstand thermal cycling. The truncated conical section of the burner insert chokes the swirling flow leaving the combustion chamber thereby increasing the Reynold's number causing an increase in heat-transfer coefficient and an increase in heat transfer to the reactor. This provides a higher temperature at the uppermost portion of the primary reactor chamber than in a straight wall burner-reactor and provides a more uniform temperature in the primary reactor chamber of the reactor canister.

Turning now to the reactor canister, two rows of fins 58 are shown around the periphery of the canister surrounding the uppermost section of the primary reactor and located within the truncated section of the burner. While two rows of fins are shown, one row may be satisfactory. These fins increase the surface area for transfer of heat from the combustion gases to the reactor shell and additionally block the radiation line of sight from the hot combustion gases to the upper cavity 60 within the apparatus. It is apparent that these fins are preferably located to coincide with the swirling flow of combustion gases and result in a minimal pressure loss to the swirling flow.

While the invention has been shown and described with respect to a preferred embodiment, it should be understood by those skilled in the art that various changes and omissions in the form and detail may be made therein without departing from the spirit and scope of the invention.

We claim:

1. In a fuel cell reformer, an improved temperature distribution catalytic reactor-burner assembly comprising:

a housing having a combustion products outlet;

a generally cylindrical reactor canister, having a reactant inlet means and product outlet means therein, disposed within the housing for catalytically converting hydrogen containing feedstocks to hydrogen and carbon oxide products said reactor canister and housing defining a burner cavity therebetween, said reactor canister having a catalyst bed disposed therein;

an ejector vortex fuel and air inlet directing the fuel and air mixture at an angle into the burner cavity whereby the primary flow of pressurized fuel gas induces inlet airflow and swirl of the flow around and upward in the burner cavity;

a burner insert disposed against the housing inner surface having a lower cylindrical section and an inwardly and upwardly tapering truncated conical section serving to choke the flow of the combustion gases, the uppermost part of the truncated conical section generally surrounding the uppermost portion of the reactor chamber; and external heat-transfer fins circumferentially mounted on the cylindrical reactor and located within the truncated conical section of the insert to absorb heat and block radiation from the burner walls and bottom to the upper part of said housing.

2. A burner-reactor assembly as in claim 1, wherein said reactor canister further includes an upwardly extending prereactor chamber, said burner-reactor assembly further including an insulating sleeve disposed against the housing inner wall above and adjacent to the truncated conical section of the burner insert and surrounding said prereactor extension to the reactor canister.

3. A burner-reactor assembly as in claim 2 wherein the burner insert extends upward a sufficient distance to enclose essentially the reactor chamber of the reactor canister and the insulating sleeve encloses essentially the prereactor chamber of the reactor canister.

4. A burner assembly as in claim 3, wherein the heat-transfer fins are tangent to helices and cooperate with the swirling flow to minimize pressure loss through the finned section of the burner cavity.

5. In a fuel cell reformer having an essentially cylindrical reactor extending into a vortex burner, said reactor having a catalyst bed disposed therein, the improvement comprising a burner insert disposed against the inner burner walls and enclosing at least a portion of said cylindrical reactor to define a burner cavity therebetween, said insert having a cylindrical section and an inwardly and upwardly tapering truncated conical section serving to choke the outward flow of swirling combustion gases and fins attached to the external periphery of a portion of the reactor projecting into the space enclosed by said inwardly and upwardly tapering section of the insert to increase heat transfer to the reactor chamber and to increase thermal efficiency.

6. The improvement as in claim 5 wherein the external fins are tangent to helices and cooperate with the swirling combustion gases to minimize pressure loss through the finned section of the burner cavity.

* * * * *